(12) United States Patent
King (10) Patent No.: US 11,029,532 B2
(45) Date of Patent: Jun. 8, 2021

(54) EYEWEAR FRAMES AND PRODUCTION METHOD

(71) Applicant: Will King, London (GB)

(72) Inventor: Will King, London (GB)

( * ) Notice: Subject to any disclaimer, the term of this patent is extended or adjusted under 35 U.S.C. 154(b) by 666 days.

(21) Appl. No.: 15/823,848

(22) Filed: Nov. 28, 2017

(65) Prior Publication Data

US 2018/0180901 A1 Jun. 28, 2018

(30) Foreign Application Priority Data

Dec. 23, 2016 (GB) ...................................... 1622146

(51) Int. Cl.
*G02C 5/00* (2006.01)
*G02C 5/22* (2006.01)
(Continued)

(52) U.S. Cl.
CPC .............. *G02C 5/008* (2013.01); *G02C 1/10* (2013.01); *G02C 5/18* (2013.01); *G02C 5/2254* (2013.01);
(Continued)

(58) Field of Classification Search
CPC .......... G02C 5/00; G02C 5/006; G02C 5/008; G02C 5/02; G02C 5/12; G02C 5/122;
(Continued)

(56) References Cited

U.S. PATENT DOCUMENTS 2,975,426 A * 3/1961 Rabb ...................... G02C 5/143
2/13
5,708,491 A * 1/1998 Onodera .................. G02C 5/00
351/122
(Continued)

FOREIGN PATENT DOCUMENTS

AU 2011 204 833 A1 8/2011
CN 202600291 U * 12/2012
(Continued)

OTHER PUBLICATIONS

English machine translation of CN-202600291-U (Year: 2012).*
(Continued)

*Primary Examiner* — Nicholas R. Pasko
(74) *Attorney, Agent, or Firm* — Fay Sharpe LLP (57) ABSTRACT

The invention relates to an eyewear frame, comprising a forehead part with two ends and arranged to extend around the eyes of a user when worn and two temple parts each extending rearwardly from a front of the eyewear frame, and from each end of the forehead part. The forehead part and the temple part being moulded together in a single mould from a first polymer material and comprising a plastic hinge located at the junction of each end of the forehead part and each temple part, said plastic hinge being formed by a region of the polymer material having thickness which is significantly less than the thickness of corresponding forehead part ends and temple parts adjacent the plastic hinge region, such that the temple parts may be moved about the plastic hinge with respect to the forehead part between an open position in which the eyewear may be worn on a user's head, and a closed position in which the temple parts are arranged approximately parallel to the forehead part and the eyewear may be more conveniently stowed when not in use. The plastic hinges exert a restoring force which urges the temple parts of the frame to either the closed or open position, such that the eye wear frame automatically folds back to the folded position after use, or automatically opens to the open position. The plastic hinge may be formed as a curved strip.

(Continued)

US 11,029,532 B2

Page 2

The eyewear frame may be co-moulded with the first polymer material and a second polymer material, having a lower modulus of elasticity, or flexural modulus, than the first polymer.

17 Claims, 9 Drawing Sheets (51) Int. Cl.
G02C 1/00 (2006.01)
G02C 5/18 (2006.01)
G02C 5/16 (2006.01)
G02C 11/02 (2006.01)

(52) U.S. Cl.
CPC ............. *G02C 5/2272* (2013.01); *G02C 5/16* (2013.01); *G02C 11/02* (2013.01); *G02C 2200/16* (2013.01)

(58) Field of Classification Search
CPC .......... G02C 5/14; G02C 5/143; G02C 5/146; G02C 5/16; G02C 5/18; G02C 5/2218; G02C 5/2254; G02C 5/2263; G02C 5/22; G02C 5/2272; G02C 7/02; G02C 13/00; G02C 1/00; G02C 1/02; G02C 1/04; G02C 1/06; G02C 1/10; G02C 11/02; G02C 2200/14; G02C 2200/16; G02C 2200/22; G02C 3/003; B29D 12/00; B29D 12/02
USPC .......... 351/41, 103, 106, 111, 114, 124, 126, 351/129, 133, 136, 140, 153, 63, 77, 83, 351/85, 86, 90, 92, 113, 150, 151; 2/13, 2/454

See application file for complete search history.

(56) References Cited

U.S. PATENT DOCUMENTS

| | | | |
|---|---|---|---|
| 5,828,436 A | 10/1998 | Lester | |
| 6,139,143 A * | 10/2000 | Brune | G02C 3/003 16/228 |
| 8,042,937 B2 * | 10/2011 | Iimura | G02C 5/16 351/114 |
| 10,139,650 B2 * | 11/2018 | James | G05B 19/4099 |
| 2005/0270475 A1 * | 12/2005 | Curci | G02C 5/2263 351/69 |
| 2015/0323808 A1 * | 11/2015 | Chen | G02C 5/143 351/104 |
| 2016/0357028 A1 * | 12/2016 | Yang | G02C 5/2209 |

FOREIGN PATENT DOCUMENTS

| | | |
|---|---|---|
| DE | 2341605 A1 | 2/1975 |
| EP | 3118670 A1 | 1/2017 |
| FR | 2 785 058 A1 | 4/2000 |
| FR | 2 786 883 A1 | 6/2000 |
| FR | 2 906 046 A1 | 3/2008 |
| GB | 1108209 A | 4/1968 |
| WO | WO 2016/049226 A1 | 3/2016 |

OTHER PUBLICATIONS

UK Search Report of Application Serial No. GB 1322146.7 dated Jun. 1, 2017, 1 page.
Extended European Search Report for European Application No. 17203776.4 dated Apr. 30, 2018, 12 pages.

* cited by examiner

EYEWEAR FRAMES AND PRODUCTION METHOD

This invention relates to novel eyewear frames, especially frames for sunglasses which could include a lensed eye glass or a plain eye glass, as well as to the manufacturing process thereof. Existing frames typically include a lens holding part at the front and two head gripping parts at either side to hold the glasses to the users head. Existing eyewear frames suffer from a number of problems. One problem is that the user finds that the sunglasses do not fit correctly, either they are too small and grip the user too tightly at the temple region of the head or behind the ears, or they are too loose and prone to falling off. In addition users find that parts of the glasses frame rub on the bridge of the nose causing soreness after long periods of wearing the glasses, and sometimes after only short periods. Retailers try to alleviate this problem by providing a wide range of sizes at the point of sale, but this is also not satisfactory due to the large range of different styles that are also made available, leading to a large amount of retail space being required, and as retail customers tend to browse glasses themselves, this can quickly lead to a very untidy display which takes time to re-order according to style and size.

There have been some attempts to develop glasses frames which alleviate these problems by being adjustable. For example WO2015/018949 by Vazquez includes a frame made of silicone material and has zig zag parts 4 at the join between the lenses and head grips. Additionally an elastic strap 7 is provided which is adjustable to provide the desired flexibility of the adjustment to grip the glasses to the users head.

Another item of prior art is US2016299351 to Marini et al, which includes a flexural portion which flexes out to accommodate the head of the user. This invention requires rather wide head gripping arms to accommodate a series of elongate ribs, which would not be suitable for most types of eyewear.

To overcome this, the present invention proposes a new construction of a glasses frame and a method of producing the same as, which also has additional benefits of low cost manufacture. The invention is defined in the accompanying claims.

Embodiments of the invention will now be described with reference to the accompanying drawings, in which.

DESCRIPTION OF PREFERRED EMBODIMENTS

Figure 1:
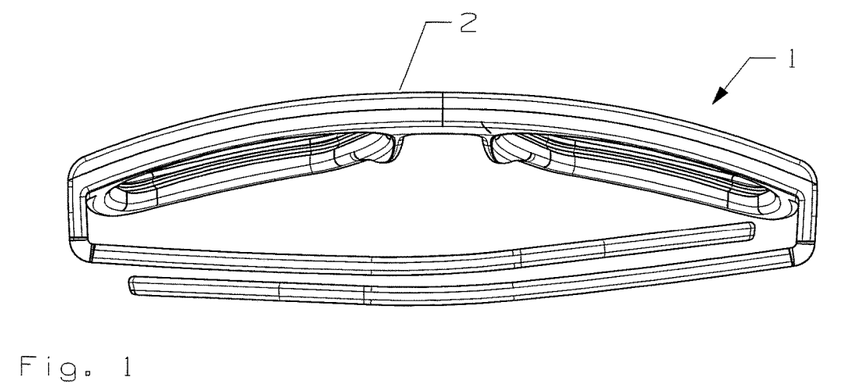
FIG. 1 shows a top view of an eyewear frame in a preferred embodiment of the invention, in a folded position.
Figure 2:
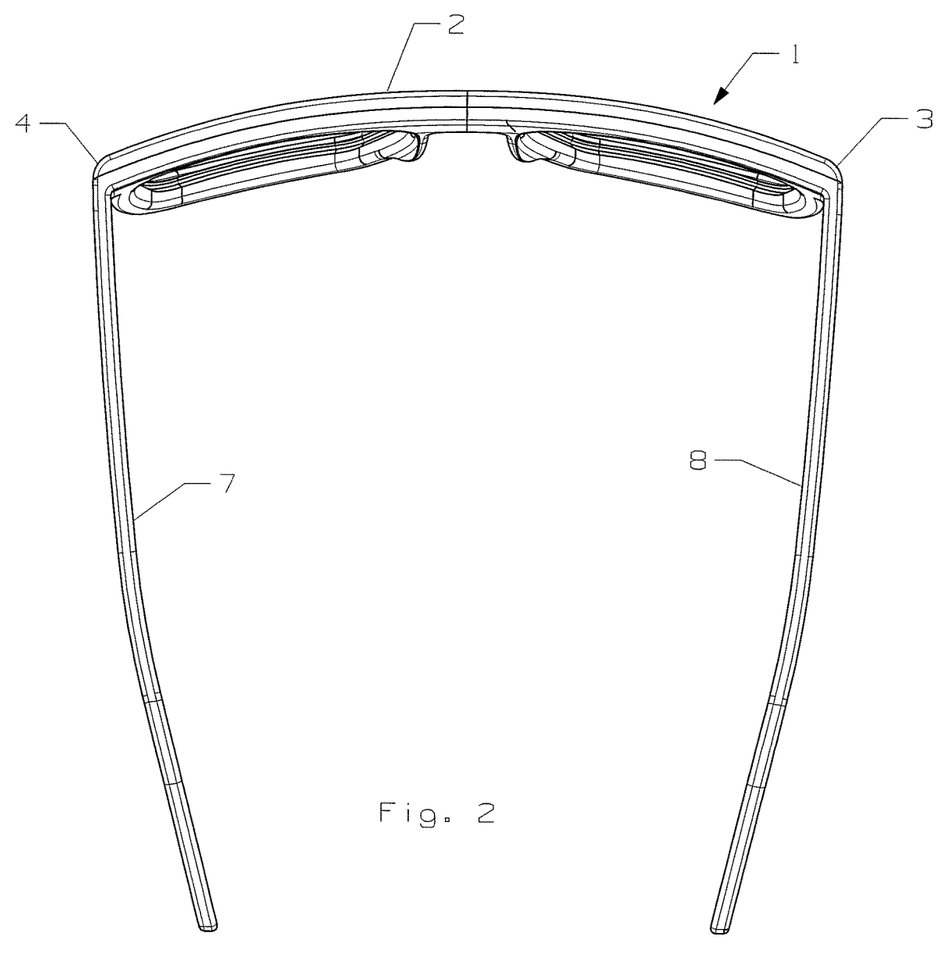
FIG. 2 shows a top view the eyewear frame of FIG. 1 in the open position.

Referring to FIGS. 1 and 2, an eyewear frame 1 is shown, comprising a forehead part 2 which comprises two ends 3, 4, the forehead part being arranged to extend around the eyes of a user when worn and comprise two lens parts 5, 6. The lens parts 5, 6 could be made of any suitable material such as plastic or glass or a composite and could for example include tinted material for sunglasses, a specific lens refractive power for vision correction spectacles, or impact resilient material for safety glasses. Two temple parts 7, 8 each extending rearwardly from each respective end 3, 4 of the forehead part 2 of the eyewear frame 1 to grip and hold the frame against the users head.

Figure 3:
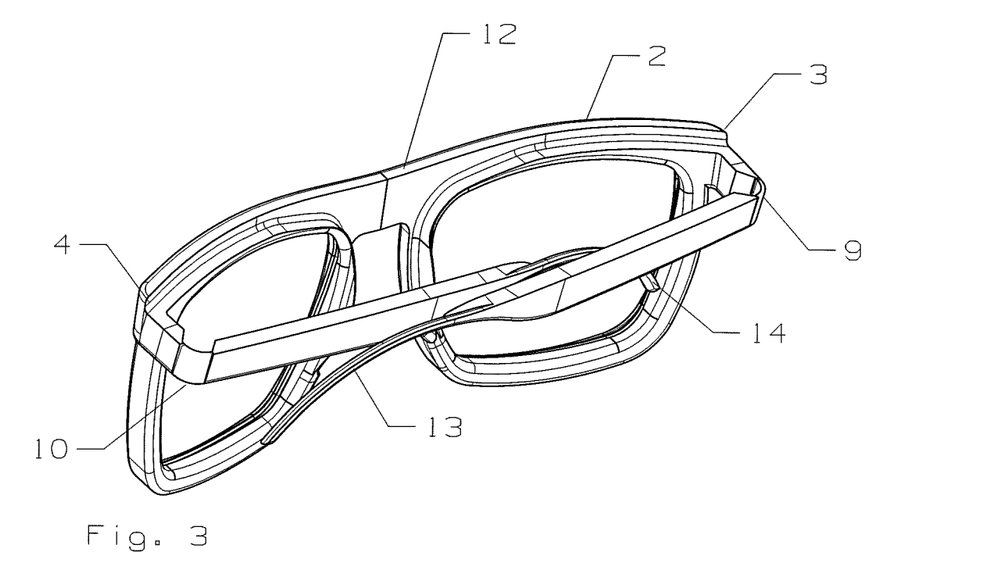
FIG. 3 shows a perspective view of the eyewear frame of the first embodiment, in the folded position, shown with just the first moulding and without a second moulding.
Figure 4:
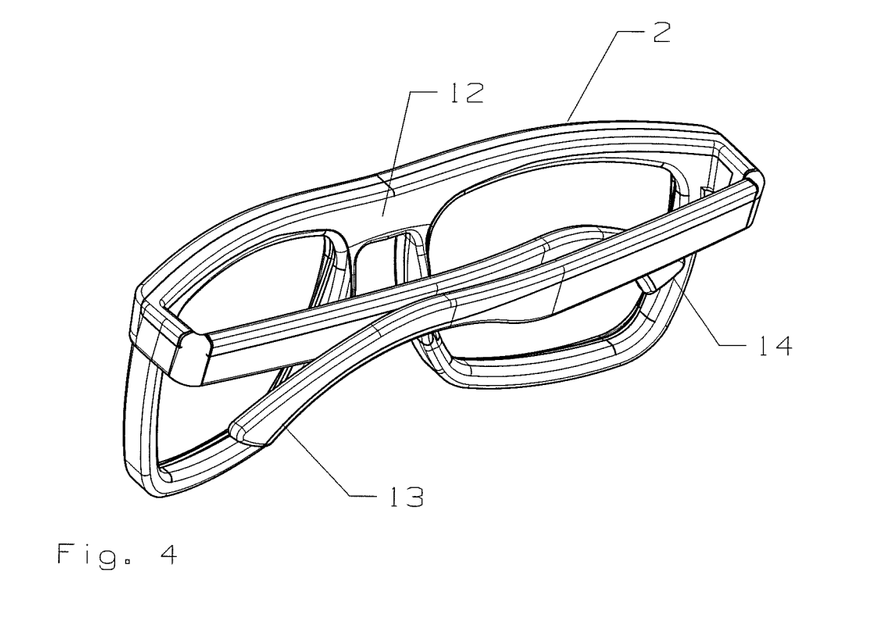
FIG. 4 shows a perspective view of the eyewear frame of the first embodiment after the second moulding.
Figure 5:
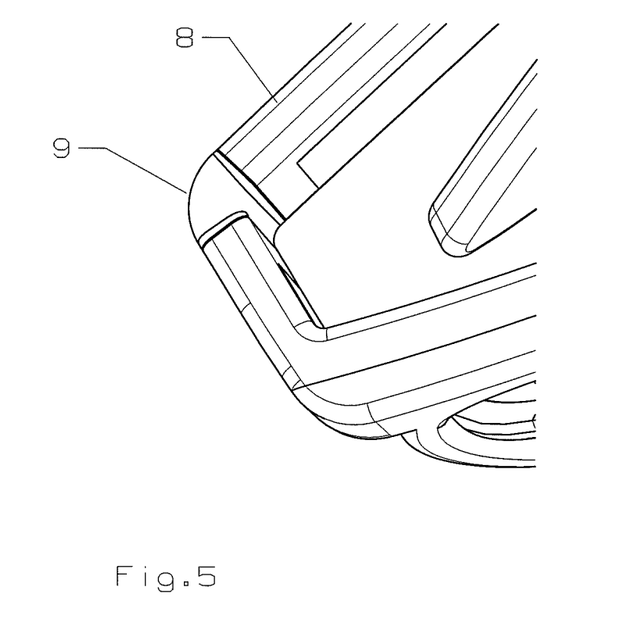
FIG. 5 shows an enlarged perspective view of the hinge portion of the eyewear frame of FIG. 1.
Figure 6:
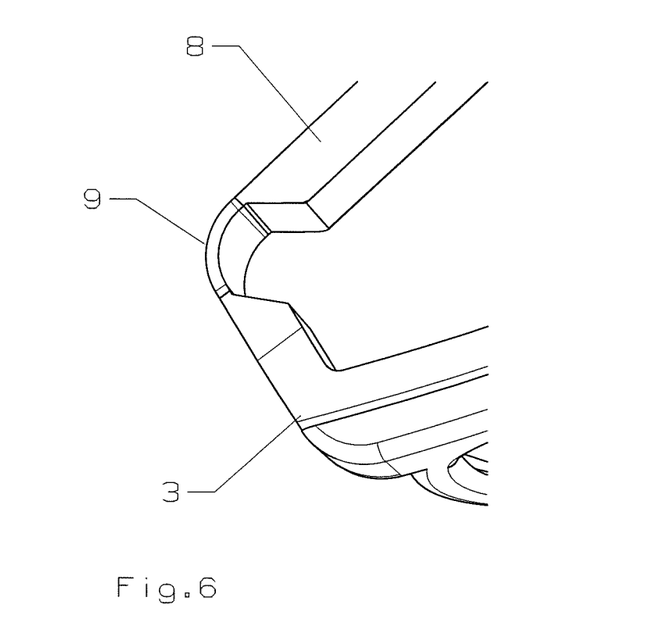
FIG. 6 shows an enlarged perspective view of the hinged portion of the eyewear frame of FIG. 3.

Referring now to FIGS. 3 and 4 the forehead part 2 and the temple 7, 8, parts of the frame 1, are moulded together in a single mould from a first polymer material and co-moulded with second polymer material. The first polymer moulding forms plastic hinges 9, 10 located at the junction of each end 3, 4 of the forehead part 2 and each temple part 7, 8. The plastic hinges 9, 10 being formed by a region of the first polymer material having thickness which is significantly less than the thickness of corresponding forehead part ends 3, 4 and temple parts 7, 8 adjacent the plastic hinge region, such that the temple parts 7, 8 may be moved about the plastic hinges 9, 10 with respect to the forehead part 2 between an open position in which the eyewear may be worn on a user's head, and a closed position in which the temple parts 9, 10 are arranged approximately parallel to the forehead part 2 and the eyewear frame may be more conveniently stowed when not in use.

In this embodiment, the plastic hinges 9, 10 are formed as curved strips 15, being of a thickness of approximately 1 mm significantly proportionally narrower than the adjacent parts of the frame, but remaining in approximately the same dimension in the height direction (as worn).

The eyewear frame 1 is co-moulded with the first polymer material and a second polymer material, the second polymer material having a lower modulus of elasticity, or flexural modulus, than the first polymer. FIG. 3 shows the eyewear frame 1, as it would look it were taken out of the mould after the first polymer was injected and before the second polymer is injected. The regions where the second polymer is absent can be clearly seen by comparing FIG. 3 with FIG. 4. These areas are the plastic hinges 9, 10, an area for the nose bridge 12 and also at the remote ends of the temple parts 9, 10 are ear contacting parts 13, 14. These parts being of a softer polymer serve to provide a more comfortable fit against the respective surfaces of the users head and reduce the extent of soreness and abrasion of the users skin caused by long term wear of eyewear made from hard materials.

It will be appreciated that the second polymer could be located in other discrete locations on the first polymer to form the eyewear frame.

When the second injection cycle of the second polymer is complete the eyewear is formed and ready to use, save further decorative and polishing steps. Thus the eyewear frame is a single moulded part and no subsequent assembly of components, such as the arms and hinges is required. This significantly reduces the manufacturing costs. As moulded the eyewear frame is at rest in the folded position as shown in FIG. 4 and FIG. 1. The user must open the temple parts 7, 8 to put on the eyewear, and when doing so the plastic hinges 9, 10, assisted by the elastic resilience of the second polymer exert a restoring force which urges the temple parts 7, 8 of the frame 1 in the direction of the closed position. When worn the plastic hinges continue to exert a restoring force on the user's head which is sufficient to grip the eyewear frame to the user's head by acting against the temple or side of the user's head. The temple parts 7, 8 automatically return to the folded position, when removed from the users head and the eyewear frame is left at rest. The softer second polymer in the region of the remoter ends of the temple parts, in the region of the users head above the user's ears, serves to cushion the effect of the restoring force. The plastic hinges 9, 10 are designed so that a desirable restoring force is present both in the folded position in order to restore the temple parts to the folded position and also in the open position 90 degrees apart when the force is also needed to hold the eyewear in position on the user's head. Consequently, the frame is also capable of accommodating large variations in the size of users' heads and still will provide a desirable holding force onto the user's head.

The first polymer in this embodiment is polypropylene monopolymer with 20% talc. Details of the specification are as follows:

Grade Reference: H130TF20/AS/2
H130TF20/AS/2 is a Polypropylene Homopolymer containing 20% Talc. The grade benefits from the addition of an antistatic additive package.
Typical Physical Properties

| Property | Unit | Test Method | Value |
| --- | --- | --- | --- |
| Melt Flow Rate | g/10 mins. | ISO 1133 (230° C./2.16 kg) | 13 |
| Nominal Density | g/cm$^3$ | ISO 1183 | 1.04 |
| Izod Impact Strength | kJ/m$^2$ | ISO 180/1A | 3.6 |
| Flexural Modulus | MPa | ISO 178 | 3200 |
| Tensile Yield Strength | MPa | ISO 527 | 34 |
| Vicat Softening Point | ° C. | ISO 306A | 152 |
| Heat Distortion | ° C. | ISO 75/B | 132 |

For the second polymer in this embodiment a preferred material is a thermo plastic elastomer (tpe). A preferred example is a material of the trademark THERMOLAST K by Kraiburg TPE GmbH referred to as compound TF3ATL series FD/tl and having the following properties:
Colour: translucent
Hardness: 35 Shore A
Density: 0.88 g/cm$^3$
Tensile Strength: 8.5 N/mm$^2$
Elongation at break 890%
Tear resistance: 10.5 N/mm
Flexural Modulus: 20 MPa A thermoplastic polyurethane (TPU) could also be used for the second polymer.

It will be appreciated that alternative materials can be used for the first polymer and the second polymer, within the principle of the invention, that the first polymer is sufficiently strong and rigid to safely support the lens on the users head, and that the second polymer is sufficiently flexible and soft to provide the desired cushioning effect at the nose bridge and above the ear, and to permit the movement at the plastic hinges 9, 10, without separation, and to provide the desired restoring force on the temple parts, as well as to provide the required grip to the lenses (see below). The flexural modulus or elastic modulus is a commonly measured property of a material and a reliable indication of the desired properties of the respective first polymer of relatively high flexural or elastic modulus and the second material of relatively low flexural modulus or elastic modulus. If alternative materials are chosen for the first and second polymers, this will affect the chosen dimensions of the respective first and second polymer parts and in particular the plastic hinges 9, 10.

Figure 7:
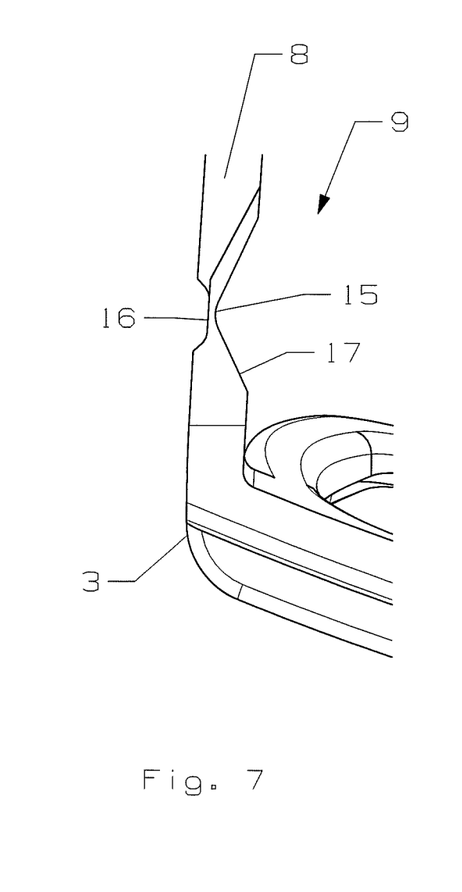
FIG. 7 shows an enlarged top view of an alternative embodiment of the hinge portion of an eyewear frame of the invention, after a first moulding.
Figure 8:
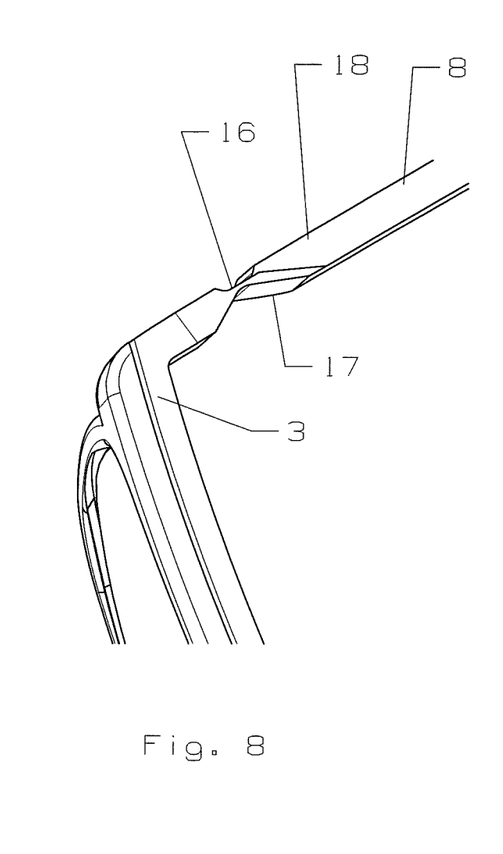
FIG. 8 shows a perspective view of the embodiment of FIG. 7, after the first moulding.
Figure 9:
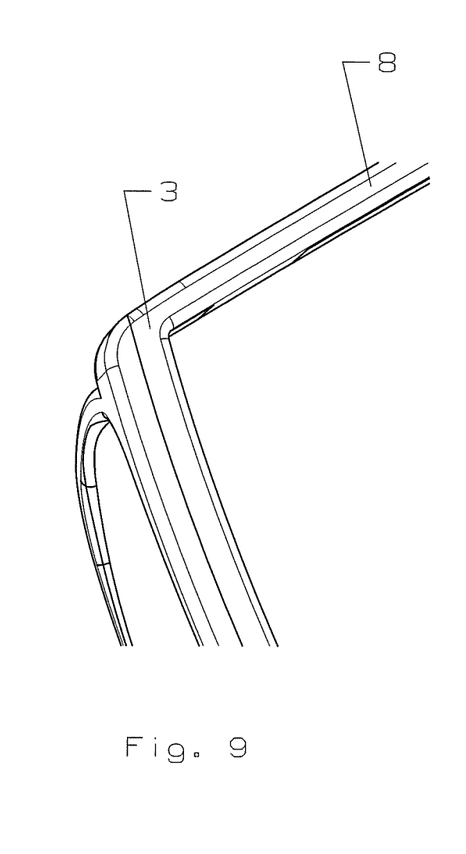
FIG. 9 shows a perspective view of the embodiment of FIG. 7 after the second moulding.

Referring now to FIGS. 7 to 9, a further embodiment of the plastic hinges 9, 10 is shown. FIGS. 7 and 8 show the extent of the first polymer only and FIG. 9 shows the finished eyewear frame with the second polymer moulded over the first polymer. In this embodiment the hinge 9 is located at the lens end of the temple part 8, and is formed from a reduced thickness web 15 which is not centrally located but located nearer to the outside of the temple part than the inside. This web 15 has a thickness of approximately 0.3 mm. Thus the resulting outside indent 16 is shallower than the inside indent 17. The shallow outside indent 16 forms a flat base with sharp sides at either end, whereas the deeper inside indent 17 is formed as a smooth curve, dimensioned to allow the temple part to fold. Further towards the remote end of the temple part 8 the height is reduced to form a slimmer temple part arm 18. As shown in FIG. 9 the finished frame includes the second polymer which fills the reduced dimension parts of the hinge 9 and the temple part arm 18.

Figures 10, 11:
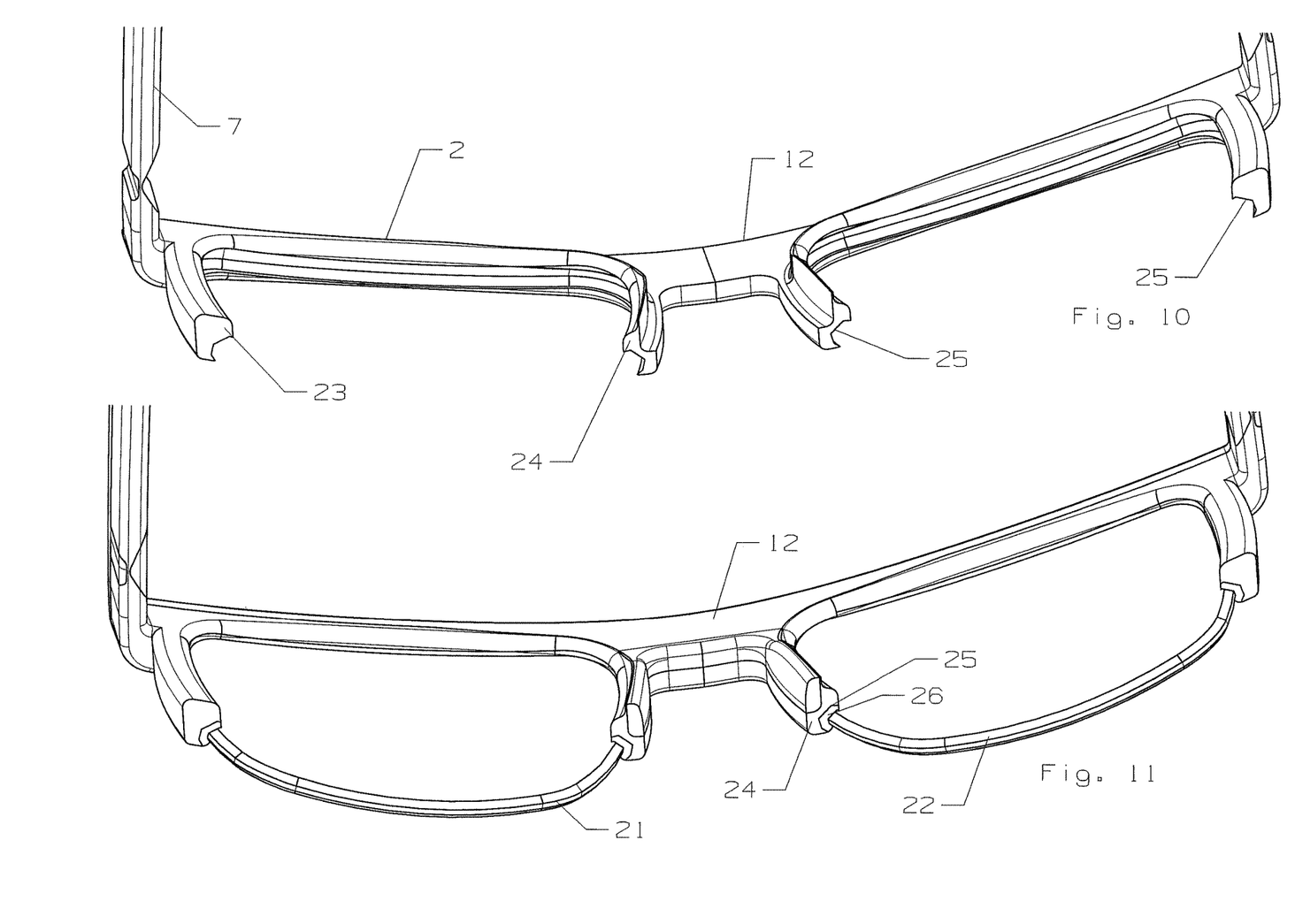
FIG. 10 shows a perspective view of an embodiment of the front end part of the eyewear after a first moulding.
FIG. 11 shows the embodiment of FIG. 10 after a second moulding and with the lenses fitted.

Referring now to FIGS. 10 and 11, an embodiment of the lens fixing portion of the eye wear frame 1 is shown including a lens fixing means 20 for locating and securing lenses 21, 22 to the frame 1. The lens fixing means is in the form of arms 23, 24 which extend down from the forehead part 2 of the frame 1 and each comprises a groove 25 which is dimensioned to receive the edge of the respective lens 21, 22. To more easily describe the embodiment, in FIG. 10 the frame is again shown without the second polymer being moulded, so just the form of the first polymer is shown with the groove 25 being dimensioned to be larger than the thickness of the lens so the lens will fit within the groove. FIG. 11 shows the completed moulded frame 1 after the moulding of the second polymer which forms an overlayer 26 of the second polymer material and in particular having the effect of narrowing the width of the accessible groove. Now the resulting groove is narrower than the thickness of the lens, such that when fitting the lenses 21, 22 to the frame 1 the lenses are is inserted into the groove 25 and necessarily the second polymer forming the overlayer is deformed permitting the lens to be inserted in the groove 25 to a final position abutting against the bottom of the groove 25 and the second polymer overlayer exerts a gripping force against the lenses 21, 22, which holds the lenses 21, 22 in position in the frame 1.

Clearly the dimensions of the grooves 25 and the thickness of the overlayer 26 in the grooves 25 will be selected to ensure that the lenses are safely gripped to the frame and that these can be varied according to the weight of the lenses and also the materials of the first and/or second polymer.

Figure 12:
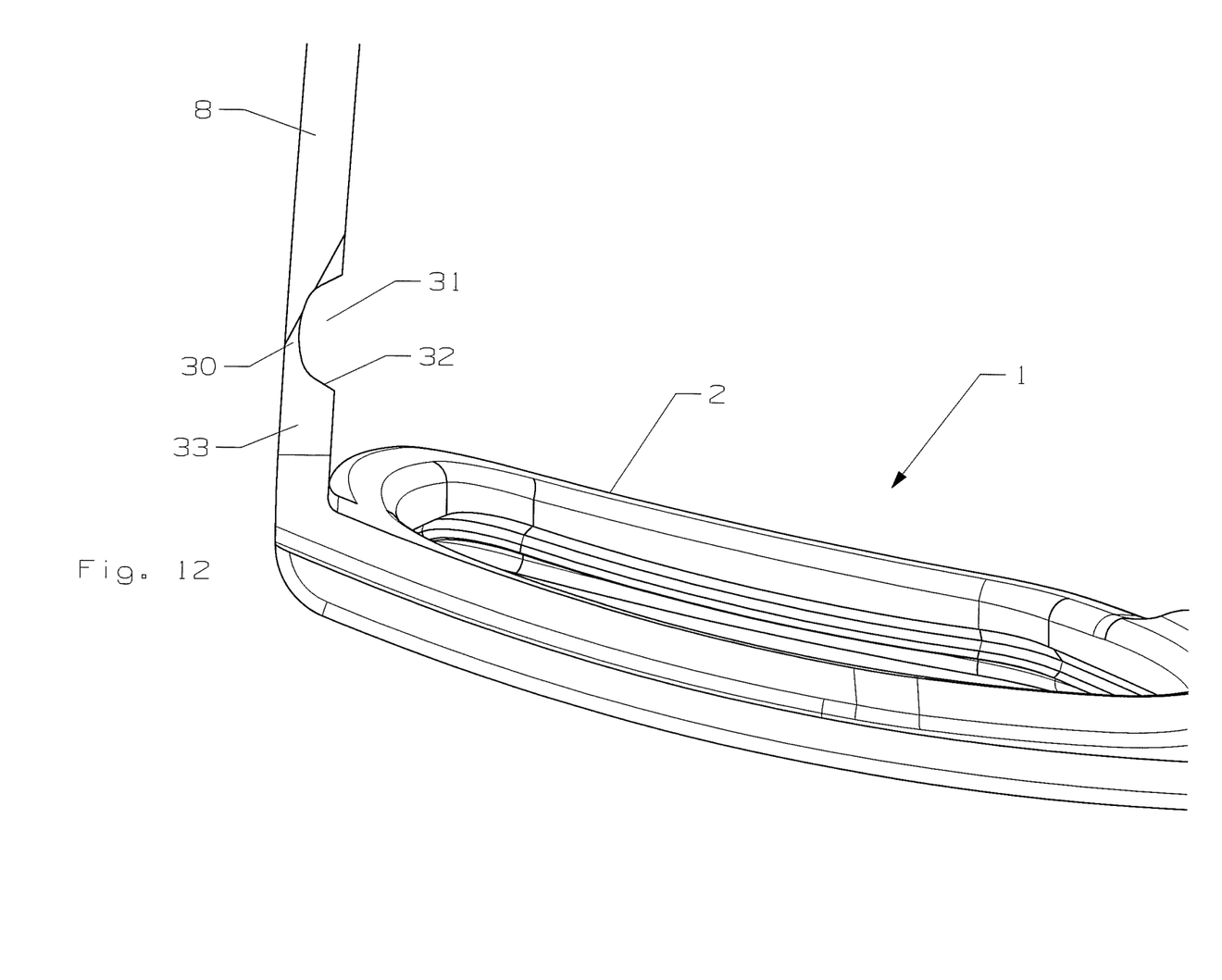
FIG. 12 shows an enlarged view of an alternative embodiment of an eyewear frame.

Referring to FIG. 12 a further embodiment is shown of a further alternative hinge. In this embodiment the first polymer is shown with the spring in the form of a leaf spring 30, being mainly flat and significantly thinner than adjacent parts. The hollowed out portion 31 is generally a wide U-shape with angled sides 32, which allows for a greater volume of the second polymer when folded and results in a softer feel when unfolding. The hinge area 33 is also reduced in height relative to the adjacent parts which serves to distribute the stress induced during opening, through the whole hinge.

In all embodiments, the thickness of the plastic hinge strip is typically between one tenth and 5 tenths of the thickness of the polymer of the corresponding forehead part ends and temple parts adjacent the plastic hinge region for materials which are presently readily available and which provide the desired longevity and cycle life. However depending on the material chosen, this ratio could be different. For stronger materials, of the first polymer, this ratio could be as high as 1:20. For weaker materials of the first polymer, this ratio could be as low as 1:1.

Similarly the plastic hinge could be dimensioned to be of a reduced size in the up and down direction (as seen with the eyewear worn on the users head) to the same extent, as shown in the embodiment of FIG. 12, instead of or as well as side to side direction, or thickness.

Figure 13:
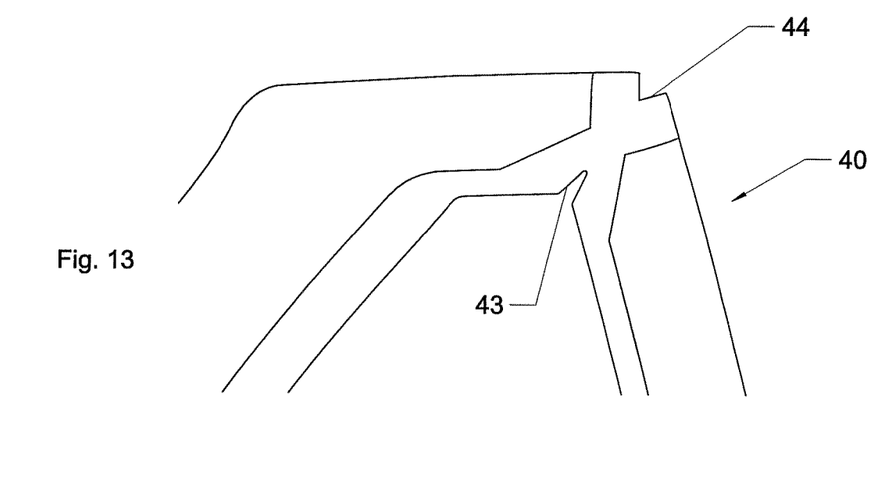
FIG. 13 shows an enlarged view of a further embodiment of an eyewear frame with an elastomer layer.
Figure 14:
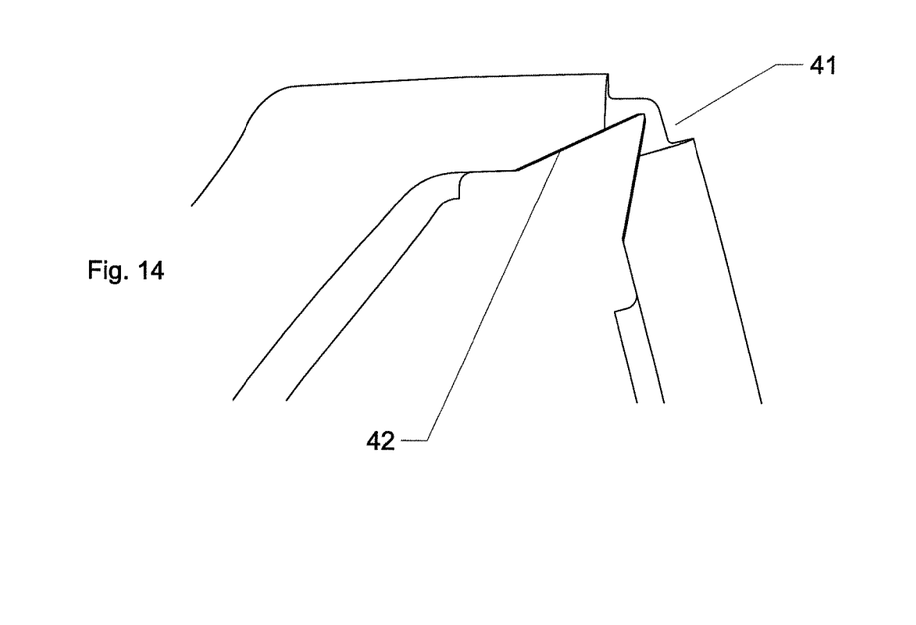
FIG. 14 shows an enlarged view of the embodiment of FIG. 13 without the elastomer layer.

FIGS. 13 to 16 show a further embodiment showing particular dimensioning of the hinge portion of the eyewear frame 40. Referring to FIG. 14, the first polymer includes a reduced thickness portion 41 on the outside of the hinge region, which is generally flat and even in dimension and extends lengthways. On the opposite inside of the hinge 42 the reduced thickness portion is sharply V shaped to permit the desired closing properties of the hinge arm. Referring to FIG. 13 the hinge is shown with the elastomer layer in place and with a V-shaped groove 43 in the elastomer layer on the inside of the hinge and a similar but wider V-shaped groove 44 in the elastomer layer on the outside of the hinge.

Figure 15:
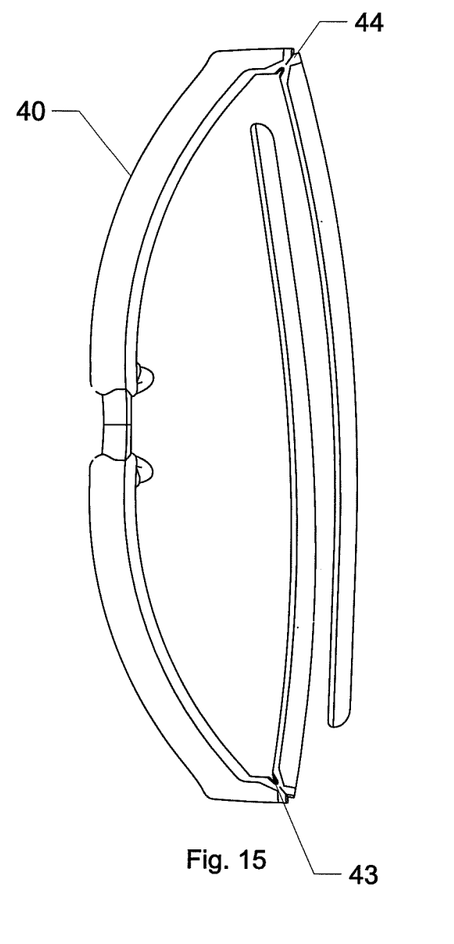
FIG. 15 shows a top view of the eyewear frame of the embodiment of FIG. 13 with the elastomer layer.
Figure 16:
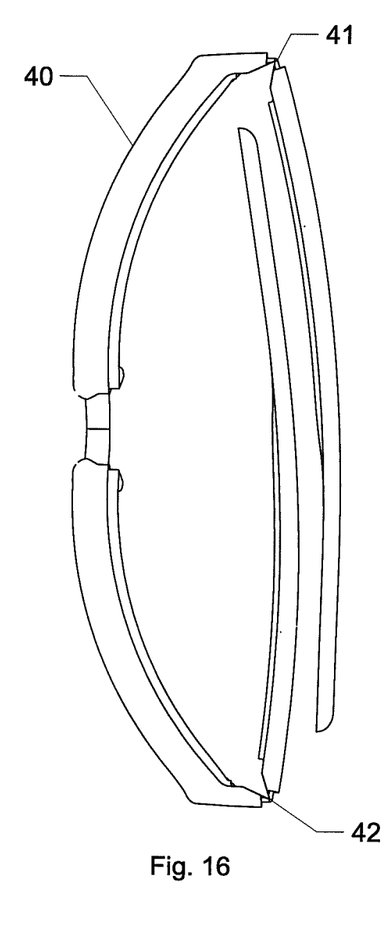
FIG. 16 shows a top view of the eyewear frame of the embodiment of FIG. 13 without the elastomer layer.

FIG. 15 shows the whole eyewear frame of the same embodiment with the elastomer layer in place showing the V-shaped grooves 43, 44 and FIG. 16 shows the frame without the elastomer layer to show the reduced thickness portions 41, 42 of the first polymer in the region of the hinges.

Figure 17:
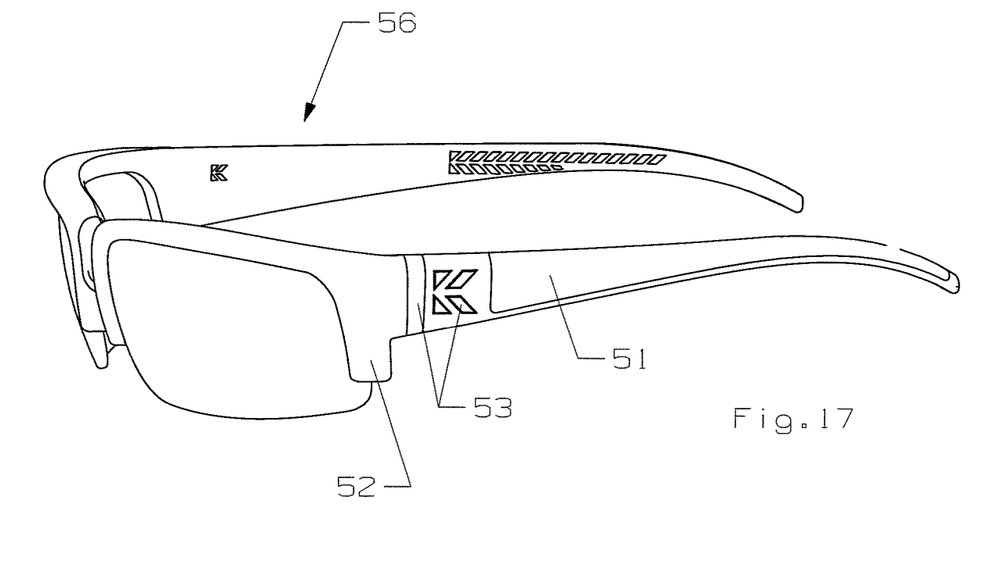
FIG. 17 is a side view of a further embodiment of an eyewear frame.
Figure 18:
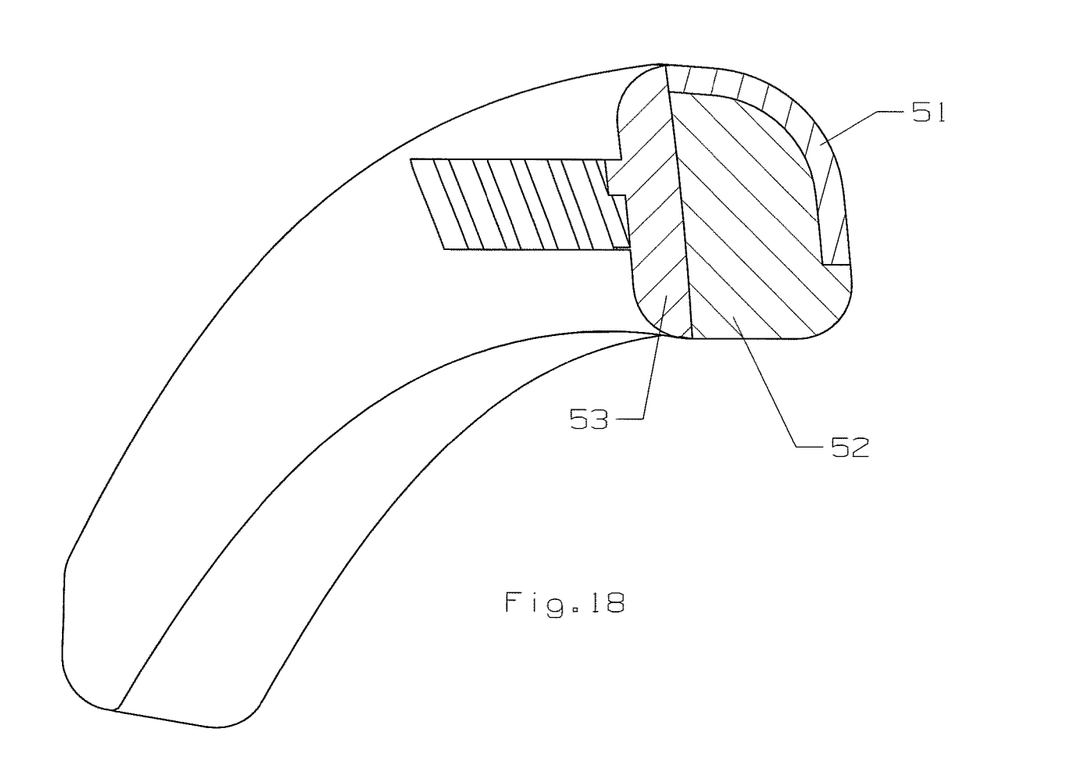
FIG. 18 is an enlarged view of the side arm of the frame of FIG. 17.

FIGS. 17 and 18 show a further embodiment of an eyewear frame 50 which further comprises a carbon fibre shell 51 which is relatively thin in cross section and may be added to the tool before moulding or secured to the eyewear frame after moulding. The frame includes a core of the first polymer 52 being preferably polypropylene and an outer elastomer layer 53 present intermittently and around the hinge region.

The hinge can be configured and moulded to produce two general types of eyewear. A first general type with the temple parts at rest in the closed position and which may be open to wear the eyewear and which automatically close to the closed position by means of the restoring force provided by the hinge. A second general type with the temple parts are at rest in the open position and which may be closed to stow the eyewear in a case, bag or retaining means and will automatically open to the open ready to wear position by means of the restoring force provided by the hinge. The first general type is more generally useful for sunglasses, whereas the second general type is suitable for reading glasses.

The invention claimed is:

1. An eyewear frame, comprising:
a forehead part comprising two ends and arranged to extend around the eyes of a user when worn and two temple parts each extending rearwardly from a front of the eyewear frame, and from each end of the forehead part, and the forehead part and the temple part being moulded together in a single mould from a first polymer material and comprising a plastic hinge located at the junction of each end of the forehead part and each temple part, said plastic hinge being formed by a region of the first polymer material having thickness which is significantly less than the thickness of corresponding forehead part ends and temple parts adjacent the plastic hinge region, such that the temple parts may be moved about the plastic hinge with respect to the forehead part between an open position in which the eyewear may be worn on a user's head, and a closed position in which the temple parts are arranged approximately parallel to the forehead part and the eyewear may be more conveniently stowed when not in use, characterised in that when the eyewear frame is at rest, the plastic hinges exert a restoring force which urges the temple parts of the frame to the closed position, such that the eye wear frame automatically folds back to the folded position after use when the eyewear frame is at rest, the plastic hinges exert a restoring force which urges the temple parts of the frame to the closed position and in order to wear the eyewear frame the user must open the temple parts against the restoring force of the plastic hinges, and when worn the plastic hinges exert a restoring force on the users head which is sufficient to grip the eyewear frame to the user's head by acting against the temples of the user's head, the eyewear frame is co-moulded with the first polymer material and a second polymer material, the second polymer material having a lower modulus of elasticity, or flexural modulus, than the first polymer, and the second polymer is located in at least two discrete locations on the first polymer to form the eyewear frame, and the second polymer is located over the plastic hinge parts of the first polymer.

2. An eyewear frame according to claim 1, characterised in that the plastic hinge is formed as a curved strip.

3. An eyewear frame according to claim 1, characterised in that the second polymer is formed over the first polymer in the region of the forehead part of the frame that is in contact with the bridge of a user's nose when the eyewear is being worn.

4. An eyewear frame according to claim 1, characterised in that the second polymer is formed over the first polymer in the region of the forehead part of the frame that is in contact with the region above a user's ears when the eyewear is being worn.

5. An eyewear frame according to claim 1, characterised in that the thickness of the plastic hinge strip is between one tenth and 5 tenths of the thickness of the polymer of the corresponding forehead part ends and temple parts adjacent the plastic hinge region.

6. An eyewear frame according to claim 1, characterised in that the second polymer includes a groove in the hinged region.

7. An eyewear frame according to claim 1, characterised in that the eyewear arms include a shell shaped layer made of a material that includes carbon fibre.

8. An eyewear frame according to claim 1, characterised in that the plastic hinges exert a restoring force which urges the temple parts of the frame to the closed position such that the eye wear frame automatically folds back to the folded position after use.

9. An eyewear frame according to claim 1, characterised in that the plastic hinges exert a restoring force which urges the temple parts of the frame to open position such that the eye wear frame automatically opens to the open position.

10. An eyewear frame according to claim 1, wherein the first polymer includes polypropylene.

11. An eyewear frame according to claim 1, wherein the second polymer is at least one of a thermo plastic elastomer or a thermo plastic polymer.

12. An eyewear frame according to claim 1, characterised in that the eyewear frame comprises as part of the front forehead part, a lens fixing means for locating and securing lenses to the frame, and in that the lens fixing means includes a slot shaped groove form from the first polymer material and an overlayer of the second polymer material.

13. An eyewear frame according to claim 12, characterised in that the slot shaped groove made from the first polymer is greater than the thickness of a lens being fitted and the second polymer over layer forms a groove which is less than the thickness of the lens, such that when fitting the lens to the frame the lens is inserted into the groove and necessarily the second polymer forming the groove is deformed permitting the lens to be inserted in the groove and the second polymer exerts a gripping force against the lens which holds the lens in position in the frame.

14. An eyewear frame according to claim 1, characterised in that the hinge portion includes a grooved portion.

15. An eyewear frame according to claim 14, characterised in that the second polymer is a thermoplastic elastomer.

16. An eyewear frame according to claim 14, characterised in that the groove is located on the outside of the hinge.

17. An eyewear frame according to claim 14, characterised in that the groove is V-shaped and located on the inside of the hinge.

\* \* \* \* \*